United States Patent [19]
Ofner

[11] Patent Number: 5,690,078
[45] Date of Patent: Nov. 25, 1997

[54] INJECTION SYSTEM FOR AN INTERNAL COMBUSTION ENGINE

[75] Inventor: Herwig Ofner, Stübing, Austria

[73] Assignee: AVL Gesellschaft Für Verbrennungskraftmaschinen und Messtechnik mbH. Prof. Dr. Dr. h.c. Hans List, Graz, Austria

[21] Appl. No.: 727,305

[22] Filed: Oct. 8, 1996

Related U.S. Application Data

[63] Continuation-in-part of Ser. No. 621,253, Mar. 25, 1996, abandoned.

[51] Int. Cl.$^6$ .................................................. F02B 43/00
[52] U.S. Cl. ........................ 123/529; 123/27 R; 123/527
[58] Field of Search ........................ 123/27 R, 27 GE, 123/525, 526, 527, 528, 529, 3

[56] References Cited

U.S. PATENT DOCUMENTS

| | | | |
|---|---|---|---|
| 3,710,770 | 1/1973 | Newkirk et al. | 123/529 |
| 4,721,078 | 1/1988 | Watanabe et al. | 123/529 |
| 4,876,989 | 10/1989 | Karpuk et al. | 123/3 |
| 5,097,803 | 3/1992 | Galvin | 123/3 |
| 5,485,818 | 1/1996 | McCandless | 123/27 R |
| 5,522,369 | 6/1996 | Povinger | 123/527 |

*Primary Examiner*—Erick R. Solis
*Attorney, Agent, or Firm*—Watson Cole Stevens Davis, P.L.L.C.

[57] ABSTRACT

In order to increase the safety of an injection system in an internal combustion engine operating on self-igniting liquefied gas as a fuel, especially after the engine has been switched off, the proposal is put forward that at least one pressurized part of the injection system be depressurized by means of a shut-down device, the latter including at least one pressure relief line which is controlled by at least one valve and opens into a tank with a low pressure level.

16 Claims, 4 Drawing Sheets

INJECTION SYSTEM FOR AN INTERNAL COMBUSTION ENGINE

RELATED APPLICATION

This application is a continuation-in-part of application Ser. No. 08/621,253, filed Mar. 25, 1996, now abandoned.

BACKGROUND OF THE INVENTION

The present invention relates to an injection system for an internal combustion engine operating on self-igniting liquefied gas as a fuel, comprising an injection unit per cylinder for direct injection of the fuel into the combustion chamber, and a fuel tank, and a fuel delivery device for drawing the fuel from the fuel tank and delivering it to the injection unit.

Conventional injection systems are designed for injecting either self-igniting or extraneously ignited liquid fuels. At conditions of ambient pressure and ambient temperature such fuels are provided in liquid form; as a consequence the storage tank is non-pressurized. Usually the liquid fuel is simultaneously employed as a lubricant for movable parts of the injection system. For this reason provisions are made for leakages and oil leakage pipes leading back to the tank.

DESCRIPTION OF THE PRIOR ART

In DE 35 23 855 A1 a method is described for operation of an internal combustion engine using a cracked gas obtained from methanol and air. Methanol is usually stored in depressurized condition in conventional storage tanks. The cracked gas, which is also known as synthetic gas, consists of hydrogen and carbon monoxide and is produced in a gas-producing unit at the pressure required for injection, which is in the range of 80–100 bar. The cracked gas is ignited either by a spark or another fuel with good ignition qualities, such as diesel. Cracked gas is not a self-igniting liquefied gas. It is not directly injected into the combustion chamber of the engine but blown in indirectly at high pressure. Such an injection system cannot be used for direct injection of a self-igniting liquefied gas in an internal combustion engine operating on liquefied gas.

Another known type of fuel used in this context is a liquefied gas stored under pressure. The Russian Abstract SU 1040-206-A (Soviet Inventions Illustrated, Q53, 1984) describes a gas-operated internal combustion engine with a fuel tank for liquefied gas, i.e., butane, which is pressurized with the use of another compressed gas, i.e., methane. Conventional liquefied gases such as propane or butane are fuels whose ignition is effected by outside means and which are introduced into the combustion chamber as gases premixed with air (fuels for use with Otto engines).

Newly developed liquid gas fuels with high cetane number, such as dimethyl ether, have a vapor pressure of less than 30 bar at ambient temperature and may be used as self-igniting fuels. If such liquid gases are used with conventional diesel injection systems, the danger of cavitation will rise on account of the high vapor pressure of such fuels, in particular in areas of a local pressure drop, which will lead to fuel delivery problems and increased wear.

Since self-igniting liquid gas fuels evaporate under normal ambient conditions and since they can form an ignitible or explosive mixture together with air, the fuel must be prevented from leaking out of the system by all means. This is rendered difficult by the high permanent pressure that must be maintained in the system to keep the fuel in its liquid state. Especially after engine switch-off the internal pressure prevailing in the injection system represents a certain safety risk in the instance of leakages, no matter how small they are.

SUMMARY OF THE INVENTION

It is an object of the invention to avoid these disadvantages and to further develop an injection system for self-igniting liquid fuels as described above, which will exhibit increased safety, especially after engine switchoff.

In the invention this object is achieved by configuring the fuel tank as a low-pressure storage tank, and by providing that at least one pressurized part of the injection system can be depressurized by means of a shut-down device, the said shut-down device including at least one pressure relief line which is controlled by at least one valve and leads into a tank of low pressure level. Between the low-pressure storage tank and the fuel delivery device there is provided a first valve of the shut-down device. It is preferred that the shut-down device should have a collecting tank into which opens at least one pressure relief line departing from a pressurized part, such as the suction line and/or pressure line of the fuel delivery device and/or the injection line, which pressure relief line is controlled by at least one second valve. The collecting tank conveniently should be suction-drained via a pumping device, preferably by evacuation to a pressure of not more than 1 bar, or, even more preferable, to a pressure of not more than 0.9 bar. In this way no liquefied gas will be able to leak out of the system.

It is provided in a preferred variant that the collecting tank be connected to the low pressure storage tank via the pumping device. In this manner the liquefied gas collected in the collecting tank can be fed back into the low pressure storage tank and the injection system.

Another variant, which is given special preference, proposes that each injection unit and/or the fuel delivery device be connected to the collecting tank via fuel feedback lines preferably containing at least one check valve. This will permit the use of injection parts of conventional systems with fuel feedback lines while ensuring that the injection system is leakage-free vis-a-vis its environment.

After engine switchoff the fist valve positioned between the low-pressure storage tank and the fuel delivery device is shut and the second valve positioned between the pressurized parts of the line and the collecting tank is opened. As a result the liquid fuel remaining in the system is drained into the collecting tank and gasified at low pressure. The pumping device compresses the gas and forces it back into the low-pressure storage tank, thus liquefying the gas once more.

In a variant which is preferable from an energy point of view it is proposed that the shut-down device be provided with a further pressure relief line which departs from a high-pressure distributing tank and opens via a third valve into the low-pressure storage tank. After engine switchoff the pressure of the high-pressure distributing tank is unloaded into the low-pressure storage tank by opening the third valve. After the third valve and the first valve have been shut the second valve is opened and the liquified gas contained in the injection system is drained into the collecting tank.

It is provided in another advantageous variant of the invention that the shut-down device be part of a pressure control unit connected to the low-pressure storage tank, which is used to maintain a constant interior pressure at a level above that of the vapor pressure of the liquefied gas, i.e., preferably between 6 and 30 bar. In this way the number of components can be reduced. The fuel is kept in a subcooled liquid state and the pressure in the low-pressure storage tank may be maintained at a constant level above the vapor pressure, to prevent cavitation on the suction side of the fuel delivery device. Reliable pressure control is achieved by providing the collecting tank with a supply line for an external control gas, preferably nitrogen. As a consequence, control gas, such as nitrogen, may be drawn into the collecting tank and subsequently delivered to the low-pressure storage tank at a stage in the operating cycle when there is a partial vacuum in the collecting tank while a further pressure rise is required in the low-pressure storage tank.

In yet another variant of the invention, which is considered as particularly advantageous, the proposal is put forward that the low-pressure storage tank be divided by means of a flexible compensating element into a liquid gas space and a compensation space, into which opens a gas feeder line of the pressure control unit. Since this will prevent any direct contact between the liquid gas and the control gas, the use of normal air as a control gas is permissible.

To minimize the safety risk the injection system preferably is designed to be leakage-free vis-a-vis its environment.

BRIEF DESCRIPTION OF THE DRAWINGS

The invention will be further described with reference to the accompanying drawings, in which.

DETAILED DESCRIPTION OF PREFERRED EMBODIMENTS

Figure 1A:
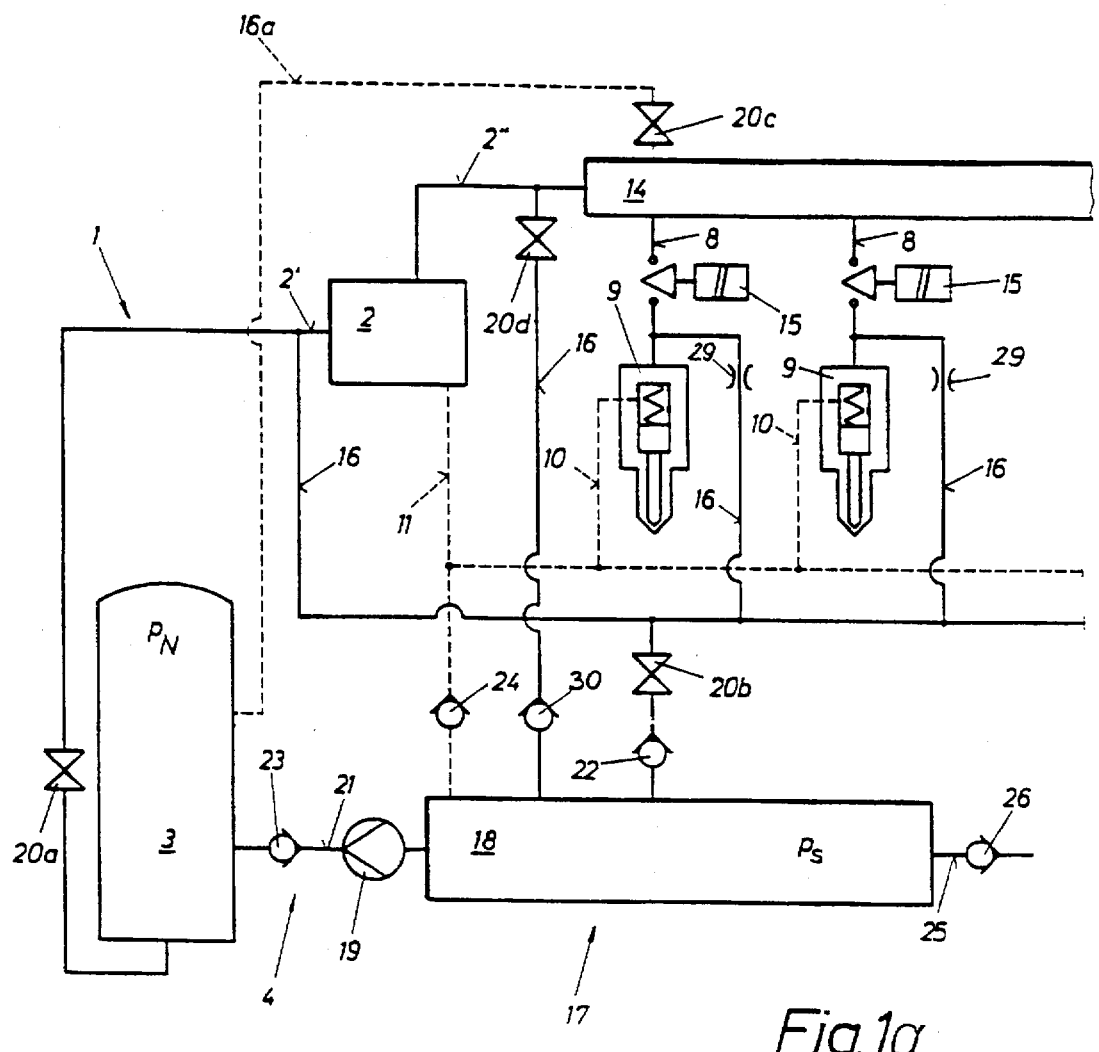
FIGS. 1a, 1b, 1c and 2 show variants of injection devices as described by the invention.

FIG. 1a shows an injection system 1 according to the invention, for direct injection of liquefied gas. The fuel delivery device 2 delivers the liquid fuel via a high-pressure distributing tank 14 and high-pressure lines 8 to the individual injection units 9.

The pressure in the high-pressure distributing tank 14 may amount to 200 bar, for example. Because of the properties of the liquefied gases used in this context there will be no need for higher pressures generally. In the injection lines 8 leading from the high-pressure distributing tank 14 to the injection units 9 solenoid valves 15 are provided which are actuated by means of a control unit not shown in this drawing. The valves 15 could also be integrated in the injection units 9.

According to the invention pressurized parts of the injection system 1, such as the suction line 2' and the pressure line 2" of the fuel delivery device 2 and the injection unit 9, can be depressurized via pressure relief lines 16 of a shut-down device 17. Those pressure relief lines 16 to the injection units 9 must guarantee a considerably high flow resistance in order to prevent a high bypass flow into the pressure relief lines 16, which would impede the injection units 9 in being pressurized. For avoiding that the pressure relief lines 16 of the injection units 9 are provided with a throttle 29 per injection unit 9. The shut-down device 17 includes a collecting tank 18 to which is connected a pumping device 19. The shut-down device further comprises a first shut-down valve 20a and second shut-down valves 20b and 20d. The pressure relief lines 16, in which the second shut-down valve 20d is situated, branches off from the pressure line 2" and leads directly to the collecting tank 18, as shown in FIG. 1a.

In a preferred embodiment the collecting tank 18 is connected to the low-pressure storage tank 3 via line 21, the pumping device 19 being provided in this line 21. The pressure relief line 16 leading to the collecting tank 18, and the line 21 each contain at least one check valve, i.e., 22, 30 and 23, respectively.

The collecting tank 18 is maintained at a pressure level at least lower than the pressure $p_N$ of the low-pressure storage tank 3, preferably at ambient pressure, and preferably at a pressure $p_S$ lower than ambient pressure. If the pressure pS in the collecting tank 18 is lower than, or equal to, the ambient pressure, this will prevent any gas from leaking out. The fuel in the collecting tank 18 is in its gaseous state. After engine switchoff the first shut-down valve 20a is shut, then the second shut-down valves 20b and 20d are opened and the fuel remaining in the system is drained into the collecting tank 18. The pumping device 19, which is configured as a compressor, will compress the gas and feed it back into the low-pressure storage tank 3, where it is liquefied once more.

In a variant preferable from an energy point of view, which is indicated by broken lines in FIG. 1a, the high-pressure distributing tank 14 is connected to the low-pressure storage tank 3 by a pressure relief line 16a; the flow through line 16a is controlled by a third valve 20c. In this manner the fuel in the high-pressure tank 14 is directly purged into the low-pressure tank 3, and not into the collective tank 18 where it subsequently must be recompressed again for returning it into the low-pressure tank 3. After engine switchoff the third valve 20c is opened first for a short time, such that the pressure in the high-pressure tank 14 is relieved into the low-pressure tank 3. After pressure compensation the third valve 20c is shut again. After the first valve 20a has been shut the second valves 20b and 20d are opened, and the remaining pressure in the injection system 1 is unloaded into the collecting tank 18 via the pressure relief lines 16.

If the fuel delivery device 2 and the injection units 9 are constituted by conventional parts with fuel feedback lines 10, 11, the latter may be connected to the collecting tank 18, possibly by a check valve 24, as indicated in the drawings by broken lines. This will provide a closed fuel system with the use of elements of conventional diesel injection systems.

The pumping device 19 will control both the pressure pS in the collecting tank 18 and the pressure pN in the low-pressure storage tank 3. The pressure in the low-pressure tank 3 must always be at a certain level above the vapor pressure of the fuel in order to prevent cavitation on the suction side 2' of the fuel delivery device 2. On the other hand a pressure pS of preferably 1 bar or less must be ensured in the collecting tank 18.

If the collecting tank 18 is at operating pressure $P_S$ while the required low pressure level $P_N$ has not yet been reached in the low-pressure storage tank 3, additional gas must be supplied, preferably a largely inactive gas such as nitrogen. This is conveniently done via a supply line 25 leading into the collecting tank 18, in which line 25 there is placed a valve 26. The valve 26 may be configured as a simple check valve.

Figure 1B:
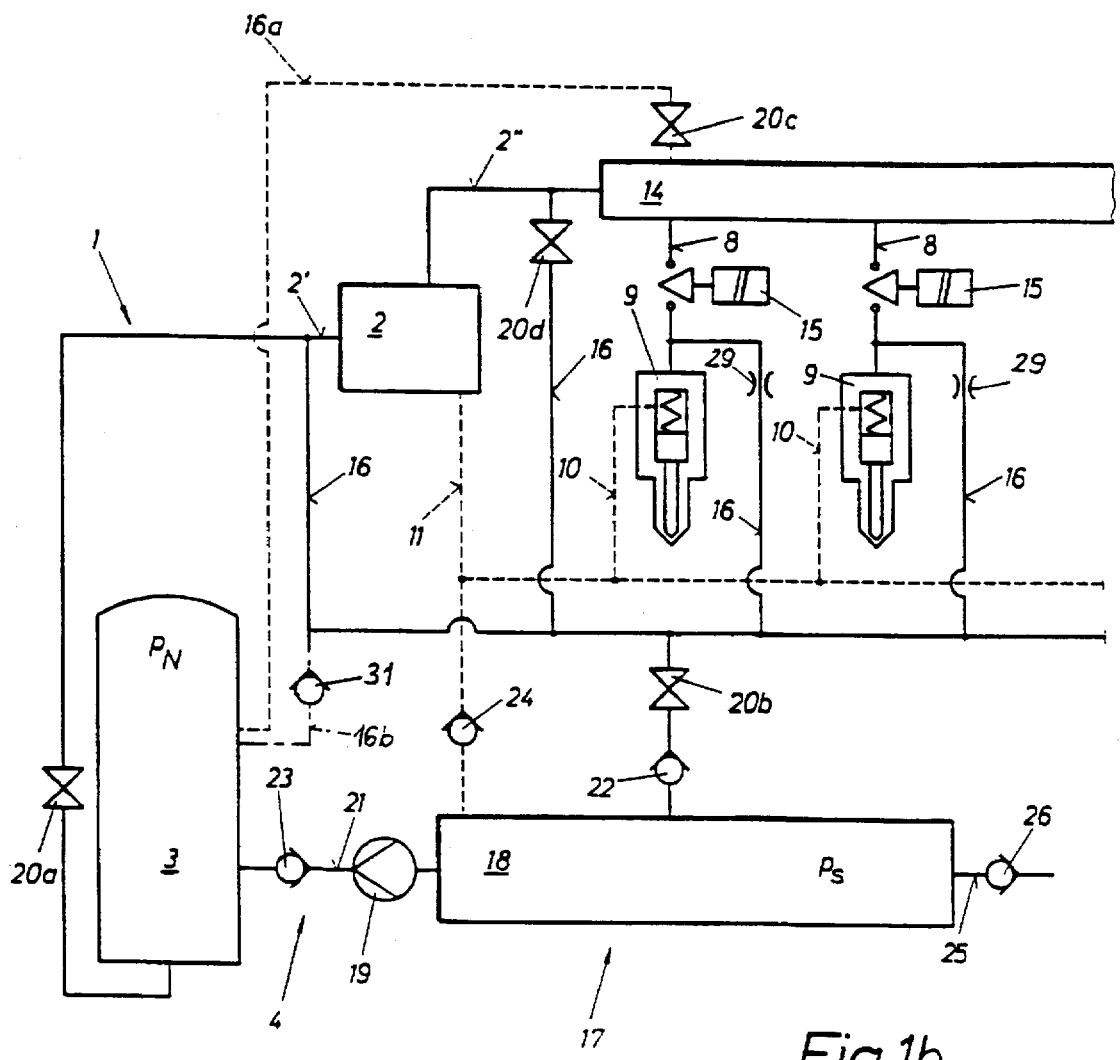

FIG. 1b shows a similar injection system of the invention as in FIG. 1, wherein the relief line 16 comprising the second shut-down valve 20d is arranged downstream of the valve 20b.

In a variant, which is indicated by dash-and-dot lines, the pressure relief line 16 is connected to the low-pressure storage tank 3 by a further pressure relief line 16b, in which a check-valve 31 is situated. In this way the pressure of the pressure relief lines 16 is unloaded to the low-pressure storage tank 3, whenever the pressure level of the relief lines becomes larger than the pressure level $p_N$ of the low-pressure storage tank 3.

Figure 1C:
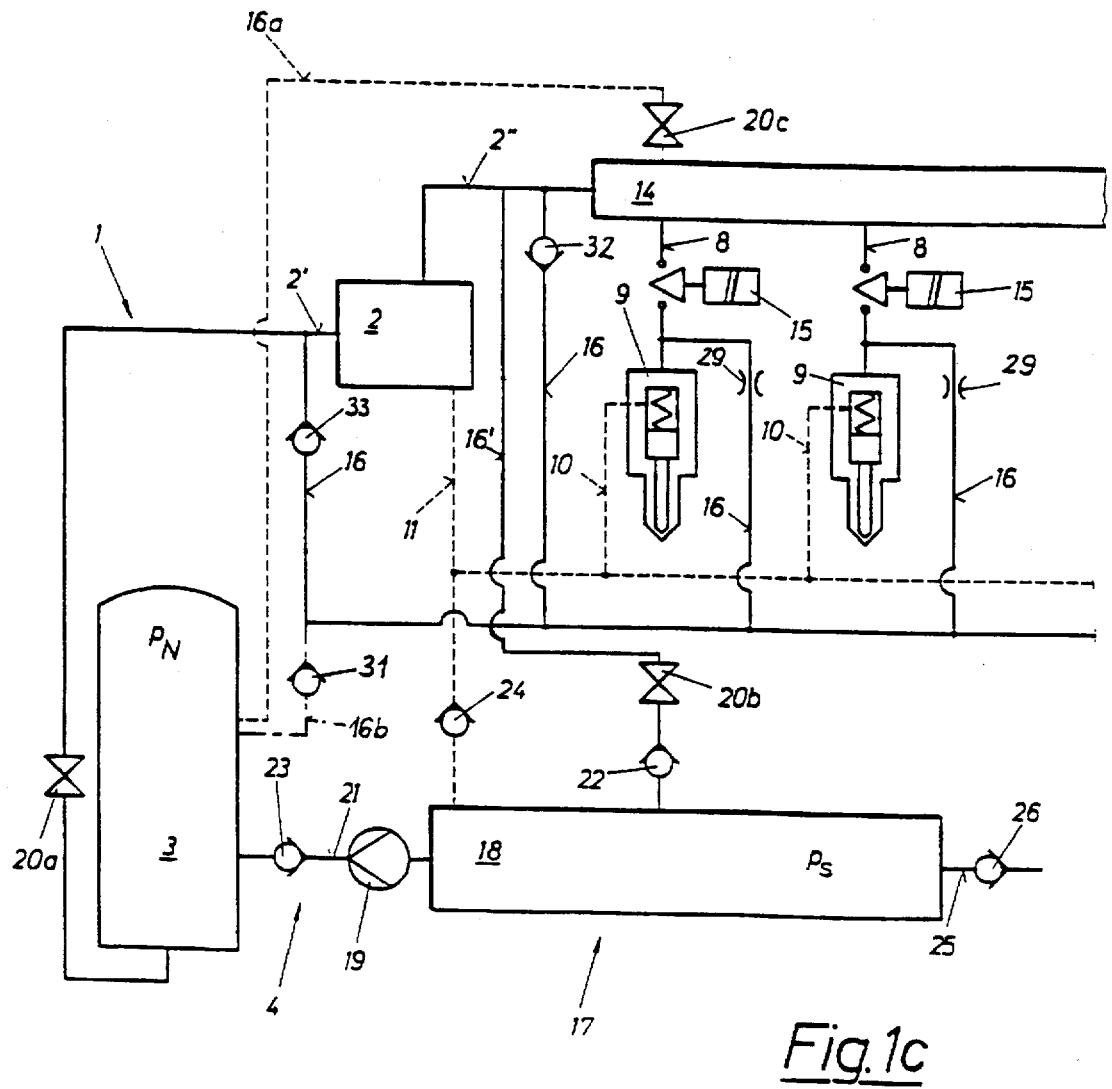

FIG. 1c shows a further injection system of the invention. Instead of the valve 20d there is placed a check valve 32 in the relief line 16 between the injection units 9 and the pressure line 2" of the fuel delivery device 2, opening in the direction of the pressure line 2". Said pressure line 2" is further connected to a relief line 16' leading to the second shut-down valve 20b.

As described above at the embodiment of FIG. 1a, after engine switchoff the third valve 20c is opened first for a short time, such that the pressure in the high-pressure tank 14 is relieved into the low-pressure tank 3. After pressure compensation the third valve 20c is shut again. While the pressure level of the pressure relief line 16 is higher than the pressure level $p_N$ of the low-pressure storage tank 3 the pressure is unloaded to the low-pressure storage tank 3 via the further pressure relief line 16b. After the first valve 20a has been shut and after pressure compensation via the further pressure relief line 16b the second valve 20b is opened, and the remaining pressure in the injection system 1 is unloaded into the collecting tank 18 via the pressure relief lines 16 and 16'.

Figure 2:
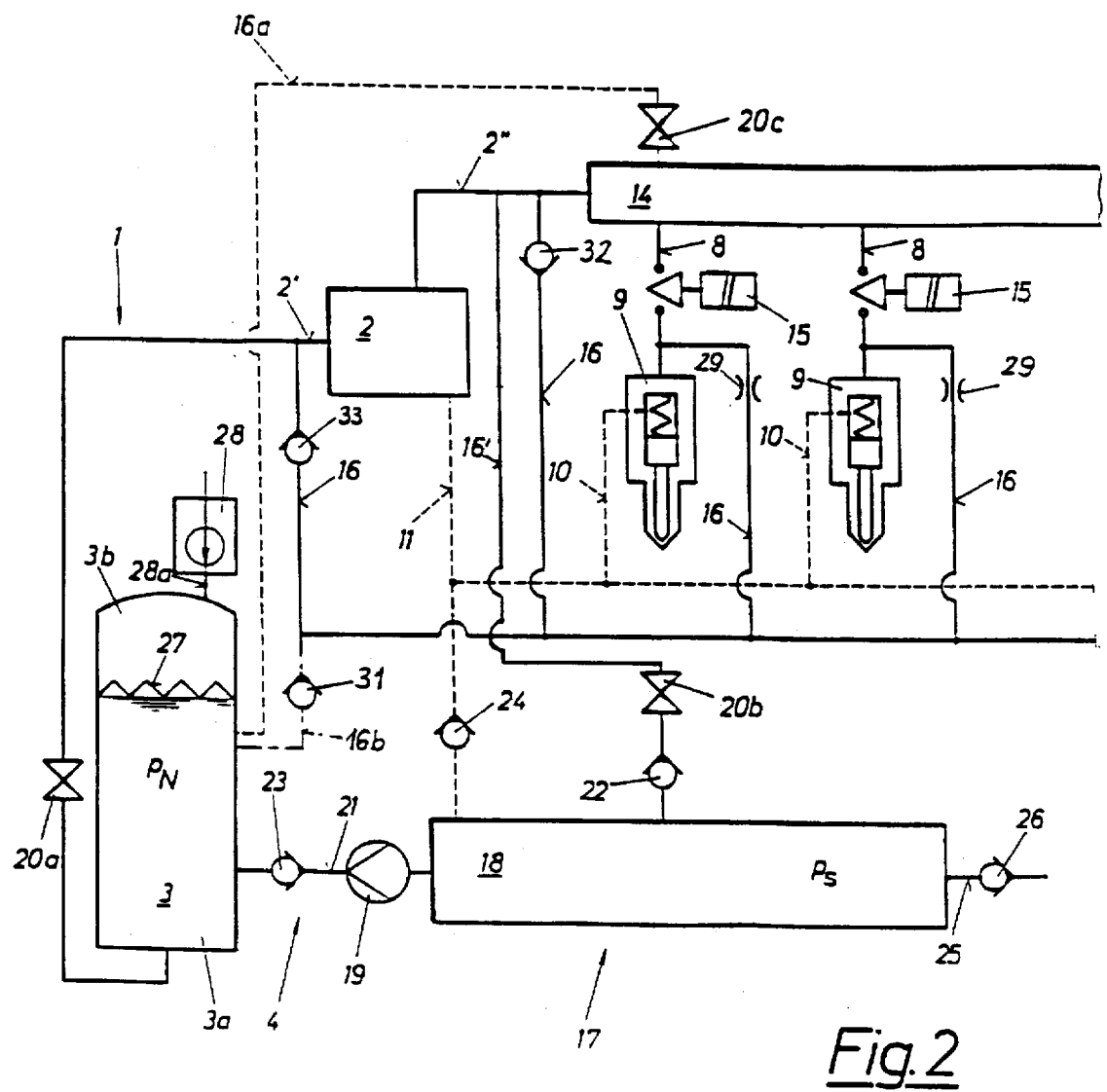

FIG. 2 shows an injection system of the invention, in which the low-pressure storage tank 3 is divided by a flexible compensating element 27 into a liquid gas space 3a and a compensation space 3b which contains a gas. Into the compensation space 3b leads the gas feeder line 28a of a pressure control unit 28, via which control gas may be introduced into the low-pressure storage tank 3. Due to this flexible compensating element 27 no direct contact can take place between the control gas and the liquid gas, which will permit the use of air as a control gas.

Though the assembly of the pressure relief lines 16, 16' shown in FIG. 2 is similar to the embodiment of FIG. 1c, it stands to reason that also the assemblies of pressure relief lines 16 of FIGS. 1a and 1b, respectively, can be used together with said low-pressure storage tank 3 shown in FIG. 2.

I claim:

1. An injection system for an internal combustion engine operating on self-igniting liquefied gas as a fuel, comprising:
   an injection unit per cylinder for direct injection of said fuel into a combustion chamber, and a fuel tank, and a fuel delivery device for drawing said fuel from said fuel tank and delivering it to a injection unit, wherein said fuel tank is configured as a low-pressure storage tank, and wherein at least one pressurized part of said injection system can be depressurized by means of a shut-down device, said shut-down device including at least one pressure relief line which is controlled by at least one valve and leads into a tank of low pressure level.

2. An injection system according to claim 1, wherein between said low-pressure storage tank and said fuel delivery device there is provided a first valve of said shut-down device.

3. An injection system according to claim 1, wherein said shut-down device has a collecting tank into which opens at least one pressure relief line departing from a pressurized part, said pressure relief line being controlled by at least one second valve, wherein said pressurized part comprises at least one part selected from the group suction line of the fuel delivery device, pressure line of the fuel delivery device and injection line.

4. An injection system according to claim 3, wherein said collecting tank can be suction-drained via a pumping device by evacuation to a pressure of not more than 1 bar.

5. An injection system according to claim 3, wherein said collecting tank can be suction-drained via a pumping device by evacuation to a pressure of not more than 0.9 bar.

6. An injection system according to claim 4, wherein said collecting tank is connected to said low pressure storage tank via said pumping device.

7. An injection system according to claim 1, wherein each injection unit and said fuel delivery device are connected to said collecting tank via fuel feedback lines.

8. An injection system according to claim 7, wherein said fuel feedback lines comprise at least one check valve.

9. An injection system according to claim 1, wherein said shut-down device is provided with a further pressure relief line which departs from a high-pressure distributing tank and opens via a third valve into said low-pressure storage tank.

10. An injection system according to claim 1, wherein said shut-down device is provided with a further pressure relief line which departs from said at least one pressure relief line and opens via a check valve into said low-pressure storage tank.

11. An injection system according to claim 1, wherein said shut-down device is part of a pressure control unit connected to said low-pressure storage tank, which is used to maintain a constant interior pressure at a level above that of the vapor pressure of said liquefied gas.

12. An injection sytem according to claim 3, wherein each of said pressure relief lines departing from said injection line comprises a throttle.

13. An injection system according to claim 3, wherein said collecting tank is provided with a supply line for an external control gas.

14. An injcection system according to claim 13, wherein said external control gas is selected from the group air or nitrogen.

15. An injection system according to claim 11, wherein said low-pressure storage tank is divided by means of a flexible compensating element into a liquid gas space and a compensation space, into which opens a gas feeder line of said pressure control unit.

16. An injection system according to claim 1, wherein said injection system is designed to be leakage-free vis-a-vis its environment.

* * * * *